US007089536B2

(12) United States Patent
Ueki et al.

(10) Patent No.: US 7,089,536 B2
(45) Date of Patent: Aug. 8, 2006

(54) COMPUTER SYSTEM AND METHOD FOR AIDING LOG BASE DEBUGGING

(75) Inventors: Katsuhiko Ueki, Tokyo (JP); Humitaka Tamura, Kawasaki (JP); Wataru Okamoto, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 795 days.

(21) Appl. No.: 09/867,630

(22) Filed: May 31, 2001

(65) Prior Publication Data

US 2002/0100023 A1 Jul. 25, 2002

(30) Foreign Application Priority Data

May 31, 2000 (JP) ............................. 2000-163792

(51) Int. Cl.
*G06F 9/44* (2006.01)
(52) U.S. Cl. ..................... 717/131; 717/127; 717/128; 717/130
(58) Field of Classification Search ................ 717/127, 717/128, 130, 131, 125, 158; 714/8, 26, 714/38, 47; 345/784; 382/229
See application file for complete search history.

(56) References Cited

U.S. PATENT DOCUMENTS 5,428,618 A   6/1995   Ueki et al.

5,699,507 A * 12/1997 Goodnow et al. ............ 714/38
5,742,706 A *  4/1998 Yu .............................. 382/229
5,754,760 A *  5/1998 Warfield ...................... 714/38
5,822,511 A * 10/1998 Kashyap et al. ............... 714/8

(Continued)

OTHER PUBLICATIONS

Jeffrey J.P. Tsai, et al. "A Noninterference Monitoring and Replay Mechanism for Real-Time Software Testing and Debugging", IEEE Transactions on Software Engineering, vol. 16, No. 8, Aug. 1990, pp. 897-916.

(Continued)

*Primary Examiner*—Kakali Chaki
*Assistant Examiner*—William H. Wood
(74) *Attorney, Agent, or Firm*—Oblon, Spivak, McClelland, Maier & Neustadt, P.C.

(57) ABSTRACT

A log in which a series of events occurred as a result of the execution of the target program has been recorded is inputted. A plurality of partial logs are created from the inputted log. These partial logs are normalized on the basis of the master log serving as a normalization reference. The feature value representing the degree of feature of the occurrence and nonoccurrence of an event is calculated for each of the normalized logs on the basis of the normalized logs for the remaining partial logs. In a combination of a specific partial log and another partial log, the similarity between these partial logs is calculated by performing an operation on the basis of the feature values. For example, a combination of the specific partial log and the partial log with the highest similarity is displayed.

18 Claims, 14 Drawing Sheets

U.S. PATENT DOCUMENTS

| | | | |
|---|---|---|---|
| 5,928,369 A * | 7/1999 | Keyser et al. | 714/47 |
| 5,966,537 A * | 10/1999 | Ravichandran | 717/158 |
| 6,057,839 A * | 5/2000 | Advani et al. | 345/784 |
| 6,202,199 B1 * | 3/2001 | Wygodny et al. | 717/125 |
| 6,286,131 B1 * | 9/2001 | Beers et al. | 717/125 |
| 6,622,264 B1 * | 9/2003 | Bliley et al. | 714/26 |
| 6,662,358 B1 * | 12/2003 | Berry et al. | 717/128 |
| 6,738,928 B1 * | 5/2004 | Brown | 714/26 |

OTHER PUBLICATIONS

Bogdan Korel, "PELAS—Program Error-Locating Assistant System", IEEE Transactions on Software Engineering, vol. 14, No. 9, Sep. 1988, pp. 1253-1260.

U.S. Appl. No. 08/528,247, filed Sep. 14, 1995, Pending.

* cited by examiner

```c
#include<stdio.h>
#define MAX_STR_NUM 10

// declaration of functions
void PrintError();
void reverseString(char* string);
void makeValueString(int value,char* str);
// main functions
int main(int argc,char** argv){
   char string[MAX_STR_NUM];
   // convert the number of arguments into character strings
   in ternary representation (the order of characters is in reverse)
   makeValueString(argc,string);
   // reverse the order of characters
   reverseString(string);
   // display the result
   printf(" %d to %s\n",argc,string);
}

// definition of each function
void makeValueString(int value,char* str);
  {
    // recursion end condition for recursive function
    if(value<=0)
      {
        str[0]='\0';
        return;
      }
    makeValueString( value/3,str+1);
    switch(value%3)
      {
      case 0:
        str[0]='\0';  // mistaken for '0'
        break;
      case 1:
        str[0]='1';
        break;
      case 2:
        str[0]='2';
        break;
      default:
        break;
```

FIG. 5A

```
        }
      }
    void PrintError()
      {
         printf("error\n");
      }
    void reverseString(char* string)
      {
         char tmp_char
         int n;
         int i;
         n=strlen(string);
         if(n==0)
           {
              PrintError(); // error process
           }
         else
           {
              // reverse the order of the character strings
              for (i=0;i<(n/2);i++)
                {
                   tmp_char=string[i];
                   string[i]=string[n-1-i];
                   string[n-1-i]=tmp_char;
                }
           }
      }
```

FIG. 5B

```
main(12,0x10000)
{
    makeValueString(12,0x20000)
    {
        if(value<=0)
        makeValueString(4,0x20001)
        {
            if(value<=0)
            makeValueString(1,0x20002)
            {
                if(value<=0)
                makeValueString(0,0x20003)
                {
                    if(value<=0)
                    {
                    }
                }
                switch(value%3)
                {
                    case 1:
                }
            }
            switch(value%3)
            {
                case 1:
            }
        }
        switch(value%3)
        {
            case 0:
        }
    }
    reverseString(0x20000)
    {
        n=strlen(0x20000);
        if(n==0)
        {
            PrintError()
            {
                printf(" error\n");
            }
        }
    }
    printf(" %d to %s\n",12,0x20000);
}
```

FIG. 6

```
main(13,0x10000)
{
    makeValueString(13,0x20000)
    {
        if(value<=0)
        makeValueString(4,0x20001)
        {
            if(value<=0)
            makeValueString(1,0x20002)
            {
                if(value<=0)
                makeValueString(0,0x20003)
                {
                    if(value<=0)
                    {
                    }
                }
                switch(value%3)
                {
                    case 1:
                }
            }
            switch(value%3)
            {
                case 1:
            }
        }
        switch(value%3)
        {
            case 1:
        }
    }
    reverseString(0x20000)
    {
        n=strlen(0x20000);
        if(n==0)
        else
        {
            for(i=0,i<(n/2);i++)
            {
            }
        }
    }
    printf(" %d to %s\n",13,0x20000);
}
```

FIG. 7

```
int main(int argc,char** argv)
{
    makeValueString(int value,char* str)
    {
        if(value<=0)
        {
        }
        makeValueString(int value,char* str)
        {
            if(value<=0)
            {
            }
            makeValueString(int value,char* str)
            {
                if(value<=0)
                {
                }
                makeValueString(int value,char* str)
                {
                    if(value<=0)
                    {
                    }
                    makeValueString(value/3,str+1);
                    switch(value%3)
                    {
                        case 0:
                        case 1:
                        case 2:
                    }
                }
                switch(value%3)
                {
                    case 0:
                    case 1:
                    case 2:
                }
            }
            switch(value%3)
            {
                case 0:
                case 1:
                case 2:
            }
        }
}
```

FIG. 8A

```
        switch(value%3)
        {
            case 0:
            case 1:
            case 2:
        }
    }
    reverseString(char* string)
    {
        n=strlen(string);
        if(n==0)
        {
            PrintError()
            {
                printf(" error\n");
            }
        }
        else
        {
            for(i=0,i<(n/2);i++)
            {
            }
            for(i=0,i<(n/2);i++)
            {
            }
            for(i=0,i<(n/2);i++)
            {
            }
        }
    }
    printf(" %d to %s\n",argc,string);
}
```

F I G. 8B

```
1  main()
1  {
1      makeValueString()
1      {
1          if(value<=0)
0          {
0          }
1          makeValueString()
1          {
1              if(value<=0)
0              {
0              }
1              makeValueString()
1              {
1                  if(value<=0)
0                  {
0                  }
1                  makeValueString()
1                  {
1                      if(value<=0)
1                      {
1                      }
0                      makeValueString();
1                      switch(value%3)
1                      {
0                          case 0:
1                          case 1:
1                          case 2:
0                      }
1                  }
1                  switch(value%3)
1                  {
0                      case 0:
1                      case 1:
0                      case 2:
1                  }
1              }
1              switch(value%3)
1              {
1                  case 0:
1                  case 1:
0                  case 2:
1              }
1          }
1          switch(value%3)
1          {
1              case 0:
0              case 1:
0              case 2:
1          }
```

FIG. 9A

```
1           }
1         switch(value%3)
1         {
1           case 0:
0           case 1:
0           case 2:
1         }
1       }
1     reverseString()
1     {
1       n=strlen();
1       if(n==0)
1       {
1           PrintError()
1           {
1               printf();
1           }
1       }
0       else
0       {
0           for(i=0,i<(n/2);i++)
0           {
0           }
0           for(i=0,i<(n/2);i++)
0           {
0           }
0           for(i=0,i<(n/2);i++)
0           {
0           }
0       }
0     }
1     printf();
1   }
```

| A | B | C | D | E | F | G | H |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 6 | 6 | -2 | -2 | -2 | -2 | -2 | -2 |
| 6 | 6 | -2 | -2 | -2 | -2 | -2 | -2 |
| -6 | -6 | -2 | -2 | -2 | -2 | -2 | -2 |
| -6 | -6 | -2 | -2 | -2 | -2 | -2 | -2 |
| -6 | -6 | -2 | -2 | -2 | -2 | -2 | -2 |
| -6 | -6 | -2 | -2 | -2 | -2 | -2 | -2 |
| -6 | -6 | -2 | -2 | -2 | -2 | -2 | -2 |
| -6 | -6 | -2 | -2 | -2 | -2 | -2 | -2 |
| -6 | -6 | -2 | -2 | -2 | -2 | -2 | -2 |
| -6 | -6 | 2 | 2 | 2 | 2 | 2 | 2 |
| -5 | -5 | 3 | 3 | 3 | 3 | 3 | -5 |
| -1 | -1 | -1 | -1 | -1 | -1 | -1 | 7 |
| -6 | -6 | 2 | 2 | 2 | 2 | 2 | 2 |
| 0 | 0 | 0 | 0 | 0 | 0 | 0 | 0 |
| 0 | 0 | 0 | 0 | 0 | 0 | 0 | 0 |
| 5 | 5 | -3 | -3 | -3 | -3 | 5 | -3 |
| -3 | -3 | -3 | 5 | 5 | 5 | -3 | 6 |
| -2 | -2 | 6 | -2 | -2 | -2 | -2 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| -2 | -2 | -2 | -2 | -2 | 6 | -2 | -2 |
| 4 | -4 | 4 | -4 | 4 | -4 | 4 | -4 |
| -2 | -2 | -2 | 6 | -2 | -2 | -2 | 6 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 6 | 0 | 0 | 0 | 6 |
| -2 | -2 | -2 | 6 | -2 | -2 | -2 | 6 |
| -2 | -2 | -2 | 6 | -2 | -2 | -2 | 6 |
| -2 | -2 | -2 | 6 | -2 | -2 | -2 | 6 |
| -2 | -2 | -2 | 6 | -2 | -2 | -2 | 6 |
| -2 | -2 | -2 | 6 | -2 | -2 | -2 | 6 |
| -2 | -2 | -2 | -6 | -2 | -2 | -2 | -6 |
| 2 | 2 | 2 | -6 | 2 | 2 | 2 | -6 |
| 2 | 2 | 2 | -6 | 2 | 2 | 2 | -6 |
| 2 | 2 | -5 | -5 | 2 | 2 | 2 | -5 |
| 3 | 3 | -5 | -5 | 3 | 3 | 3 | -5 |
| 3 | 3 | -2 | -6 | 2 | 2 | 2 | -6 |
| 2 | 2 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 11

|   | A | B | C | D | E | F | G | H |
|---|---|---|---|---|---|---|---|---|
| A |   | 494 | -130 | -346 | -90 | -138 | -26 | -306 |
| B |   |   | -178 | -330 | -138 | -58 | -74 | -290 |
| C |   |   |   | -58 | 70 | 22 | 70 | -18 |
| D |   |   |   |   | -82 | -66 | -146 | 470 |
| E |   |   |   |   |   | 126 | 110 | -170 |
| F |   |   |   |   |   |   | 62 | -154 |
| G |   |   |   |   |   |   |   | -170 |
| H |   |   |   |   |   |   |   |   |

FIG. 12

COMPUTER SYSTEM AND METHOD FOR AIDING LOG BASE DEBUGGING

CROSS-REFERENCE TO RELATED APPLICATIONS

This application is based upon and claims the benefit of priority from the prior Japanese Patent Application No. 2000-163792, filed May 31, 2000, the entire contents of which are incorporated herein by reference.

BACKGROUND OF THE INVENTION

This invention relates to a computer system suitable for debugging work making use of a log in which a series of events that have occurred as a result of the execution of the target program has been recorded (traced).

When a programmer does the work of correcting errors (debugging) in a program, a debugger is used for aiding the work. According to the instructions from the debugging person, the debugger activates the target program and controls the execution of the program. In the course of debugging, it can display various pieces of information useful for debugging work.

There are several known approaches in debugging. Recently, operation logs have been used more often in checking the operation of the program or in debugging work. For instance, a log-based debugging approach has been popularized. In this approach, a history of issued system calls is recorded with an operating system (OS), a history of memory access is recorded by hardware or with an emulator, and a set of these pieces of event information (log), is displayed using a dedicated viewer. This display is a help to debugging work.

Log-based debugging may be done by not only the approach of examining one log in detail to pinpoint the cause of the bug but also the approach of comparing the log obtained in the proper operation with a log obtained in an abnormal operation, searching for the parts where they differ from each other, and examining the different parts intensively to pinpoint the cause of the bug.

In debugging on the basis of such log comparison, when an unsuitable log is selected and a comparison is made, too many different parts are found, expanding the scope of examination, which decreases the debugging efficiency seriously. To avoid this problem, the debugging person selects logs that behave as similarly as possible and uses them in comparison.

Normally, similar logs should be selected, taking into account the meaning of the operation of the program. The conventional approaches are to simply compare the structure of one log with that of another and select the most similar one. The log with the number of repetitive loops in comparison being the closest to that of the proper log may be selected, with the result that debugging is not necessarily efficient.

BRIEF SUMMARY OF THE INVENTION

It is, accordingly, an object of the present invention to provide a computer system and method, which is capable of obtaining partial logs useful for log comparison and contributes to an improvement in the efficiency of log-based debugging work.

According to embodiments of the present invention, there is provided a log comparison debug support system which inputs a log in which a series of events occurred as a result of the execution of a target program are recorded, and supports debugging by performing log comparison, the system comprising a partial log creating device configured to create a plurality of partial logs from the inputted log, a master log creating device configured to create a master log by concatenating the partial logs, a normalized log creating device configured to create normalized logs by normalizing the partial logs by use of the master log serving as a normalization reference, a feature value computing device configured to compute feature values representing the degree of feature of the occurrence and nonoccurrence of the events for each of the normalized logs created by the normalized log creating device, and a similarity computing device configured to compute, in a combination of a specific partial log and another partial log, the similarity between these partial logs by performing a specific operation based on the feature values.

BRIEF DESCRIPTION OF THE SEVERAL VIEWS OF THE DRAWING

FIG. 5A shows the part of source code of the target program related to the second embodiment;

FIG. 5B shows the another part of source code of the target program related to the second embodiment;

FIG. 6 shows an example of the log created when the target program of the second embodiment is executed;

FIG. 7 shows another example of the log created when the target program of the second embodiment is executed;

FIG. 8A shows the part of master log created on the basis of the target (or source) program of the second embodiment;

FIG. 8B shows the another part of the master log;

FIG. 9A shows the part of contents of normalization corresponding to the program description of the partial log of operation log D related to the second embodiment;

FIG. 9B shows the another part of the contents of normalization;

FIG. 10 is a list of the normalized logs for partial logs A to H related to the second embodiment;

FIG. 11 is a list of the feature values of partial logs A to H related to the second embodiment; and FIG. 12 is a list of the similarities calculated for all the combinations of partial logs A to H related to the second embodiment.

DETAILED DESCRIPTION OF THE INVENTION

Hereinafter, referring to the accompanying drawings, embodiments of the present invention will be explained.

FIRST EMBODIMENT

Figure 1:
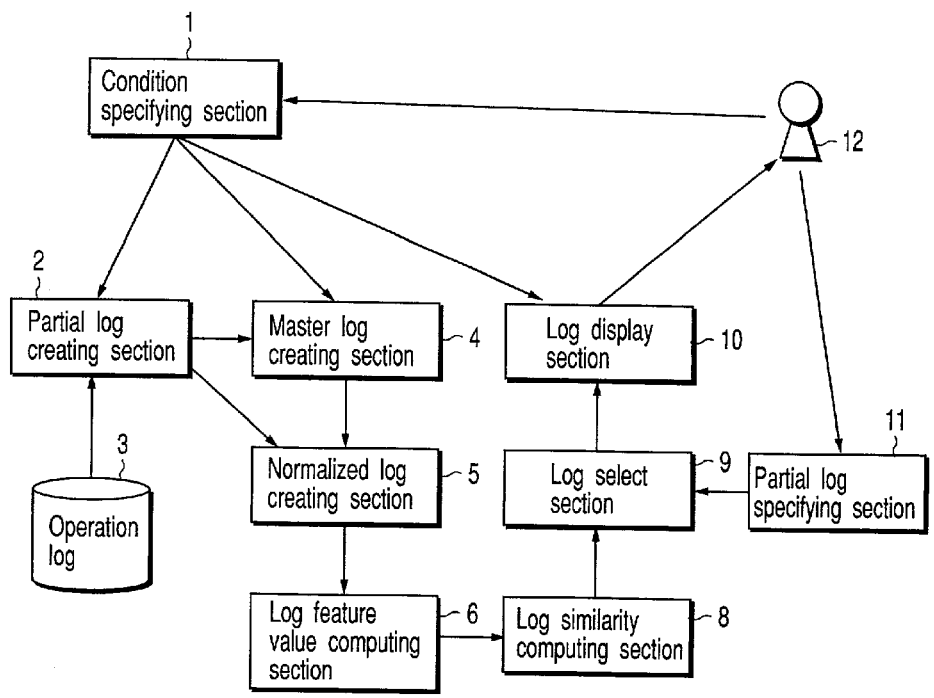
FIG. 1 is a block diagram schematically showing the configuration of a log comparison debug support system according to a first embodiment of the present invention.
Figure 3:
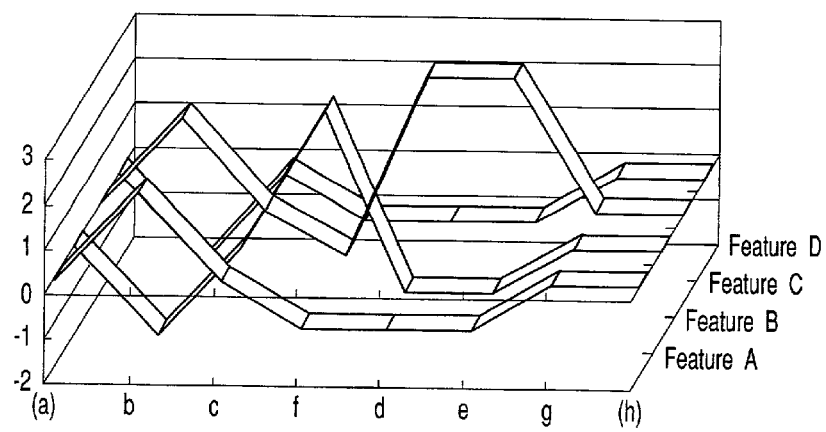
FIG. 3 is a graph showing the log feature values A to D of normalized logs A to D related to the first embodiment.

FIG. 1 is a block diagram schematically showing the configuration of a log comparison debug support system according to a first embodiment of the present invention. As shown in FIG. 1, this system comprises a condition specifying section 1, a partial log creating section 2, a master log creating section 4, a normalized log creating section 5, a log feature value computing section 6, a log similarity computing section 8, a log select section 9, a log display section 10, and a partial log specifying section 11. When a debugging person 12 gives a prepared operation log L to the log comparison debug support system of the first embodiment and specifies the condition for log comparison via the condition specifying section 1 and partial log specifying section 11, the log display section 10 displays information on the similarity between logs.

In the operation log L, a series of events that have occurred as a result of the execution of the target program (not shown) has been recorded. The type of target programs and the number of them are arbitrary. The environment of execution is also arbitrary. For instance, part of the target program may be replaced with a simulator. Part or all of the hardware the target program controls may be replaced with an emulator.

The target program for preparing the operation log L is executed by a debugger (not shown). The process of gathering and recording events is carried out by a "tracer" which is incorporated into the debugger or which is provided separately from the debugger and operates in harmony with the debugger.

"Event(s)" in the present invention have been defined in the whole debugging environment. According to the definition of events, the tracer traces the execution of the target program and records a series of events that have occurred (established) in the operation log L while executing a debugging operation (sequence) of the target program.

Figure 2:
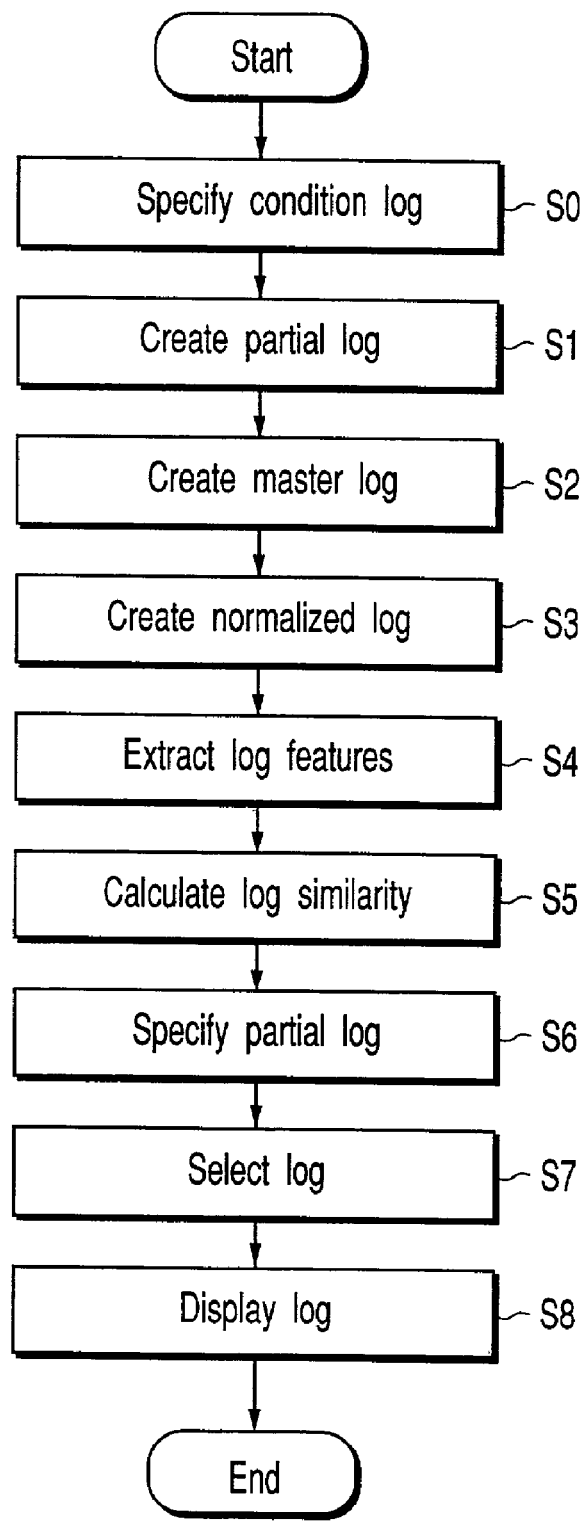
FIG. 2 is a general flowchart for the processing of the log comparison debug support system according to the first embodiment.

FIG. 2 is a general flowchart for the processing of the log comparison debug support system according to the first embodiment. Hereinafter, consider a case where the following three operation logs 1 to 3 are given as an example of the operation log L in which a series of events that have occurred as a result of the execution of the target program has been recorded:

| Operation log 1: | a b c g h |
| Operation log 2: | a c f g h |
| Operation log 3: | a b c d e g h a c g h |

Each of distinct a to h is an event which constitutes a log. Their arrangement represents the order in which the events occurred.

First, at step S0 in FIG. 2, a debugging person (user) 12 specifies not only the begin and end events of a partial log as the condition for log comparison but also an extraction rule of extracting at least part of the event sequence sandwiched between the begin and end events (condition specifying section 1).

Specifically, for instance, it is assumed that the begin and end events of the partial log are specified as event a and event h respectively. Further, the rule of extracting the event sequence sandwiched between event a and event h is also assumed that "all the events should be extracted" is specified as a log comparison condition. "All the events" means that the type of events cut off as partial logs is not limited.

At step S1, the partial log creating section 2 inputs the operation log L and creates a plurality of partial logs from the operation log L according to the log comparison condition specified at step S0. In this step, the partial log creating section 2 cuts off the event sequence sandwiched between the begin and end events, event a and event h, as a partial log from the operation logs 1 to 3.

As a result, partial log A is cut off from the operation log 1, partial log B is cut off from the operation log 2, and partial log C and partial log D are cut off from the operation log 3, that is, a total of four logs are cut off as follows:

| Partial log A: | (a) b c g (h) |
| Partial log B: | (a) c f g (h) |
| Partial log C: | (a) b c d e g (h) |
| Partial log D: | (a) c g (h) |

Since the begin and end events (that is, event a and event h) are common to each of partial log A to partial log D, they are removed from each partial log for convenience.

At step S2, the master log creating section 4 concatenates the partial logs A to D created by the partial log creating section 2 according to a specific concatenating algorithm, while leaving out the unnecessary repeated events, thereby creating the master log. The master log may be created by expanding the source program, whose data is different from the operation log L, not by using the partial logs (operation log L) as in the first embodiment. The expansion will be explained later in a second embodiment of the present invention.

In the first embodiment, partial log A to partial log D are concatenated as follows and the result of the concatenation is determined to be the master log:

| A: | b c g |
| A + B: | b c f g |
| (A + B) + C: | b c f d e g |
| ((A + B) + C) + D: | b c f d e g |

The created master log is used as a normalized reference corresponding to the log comparison condition specified in the condition specifying section 1.

At step S3, the normalized log creating section 5 normalizes partial log A to partial log D on the basis of the master log created at step S2. Specifically, the normalized log creating section 5 compares each of the partial logs A to D with the master log obtained from the master log creating section 3 respectively. For each of the partial logs A to D, the section 5 creates a bit string where 1 is set when a component event of the master log exists in the partial log, and 0 is set when such a component event does not exist in the partial log. The bit string is used as a normalized log.

In the first embodiment, the normalized logs for the partial logs A to D are as follows:

| Master log: | b c f d e g |
| Normalized log A: | (1 1 0 0 0 1) |
| Normalized log B: | (0 1 1 0 0 1) |
| Normalized log C: | (1 1 0 1 1 1) |
| Normalized log D: | (0 1 0 0 0 1) |

At step S4, the feature value computing section 6 calculates the feature values representing the degree of feature of the occurrence or nonoccurrence of events included in each of the normalized logs A to D. In this calculation, with respect to one feature value in one normalized log (e.g. log A), the other normalized logs (e.g. logs B to D) are used.

More specifically, as for the normalized value for each event in each normalized log, the following holds:

(1) When a normalized value of 1 (an event occurred), the number of logs where the corresponding normalized value has that of 0 in the other normalized logs (the event did not occur) are counted, and the resulting value is set as a feature value. If the feature value is relatively large, the occurrence (establishment) of the event is characteristic.

(2) When a normalized value of 0 (an event did not occur), the number of logs where the corresponding normalized value has that of 1 in the other normalized logs (the event occurred) are counted, and the result of subtracting the value from 0 is set as a feature value. In this case, if the absolute value of the feature value is relatively large, the nonoccurrence (unestablishment) of the event is characteristic.

For instance, since the normalized value of event b in normalized log A is 1 and the other normalized logs where the normalized value of event b has that of 0 are normalized logs B and D are 0, the value representing the log feature of event b in normalized log A is 2. Furthermore, since the normalized value of event f in normalized log A is 0 and that of event f only in normalized log B is 1, the value of the log feature of event f in normalized log A is the result of subtracting 1 from 0, or −1.

The log feature values (arrays) A to D of the normalized logs A to D are as follows:

| Feature value A: | ( 2, 0, −1, −1, −1, 0) |
| Feature value B: | (−2, 0,  3, −1, −1, 0) |
| Feature value C: | ( 2, 0, −1,  3,  3, 0) |

Feature value D: (−2, 0, −1, −1, −1, 0)

At step S5, the similarity computing section 8 calculates the similarity between partial logs by inner product on the basis of the feature values A to D for all the combinations (AB, AC, AD, BC, BD, CD) of a partial log and the remaining partial logs. It is determined that, the larger the result of the inner product, the higher the similarity between the partial logs. For instance, in comparison of (or combination of) partial log A with partial log B, the inner product of the feature values A and B of these partial logs is as follows:

AB=2*(−2)+0*0+(−1)*3+(−1)*(−1)+(−1)*(−1)+0*0=−5

The result of doing calculations for all the combinations is as follows:

AB=−5
AC=−1
AD=−1
BC=−13
BD=3
CD=−9

As shown at step S6, when the debugging person 12 specifies a reference partial log to be compared via the partial log specifying section 11, the partial log select section 9 selects a partial log with high similarity with the specified partial log on the basis of the similarity calculated at the similarity computing section 8. For instance, if the debugging person 12 has specified partial log D via the partial log specifying section 11, the log select section 9 selects partial log B as the partial log most similar to partial log D at step S7.

Then, at step S8, the log display section 10 preferably displays partial log B and partial log D in such a manner that the parts where they differ are highlighted. Persons skilled in the art will recognize that logs similar to partial log B may be arranged and displayed in the order of similarity.

When a configuration where the partial log specifying section 11 is eliminated from that of described above, the similarities for all the combinations are displayed. In this case, the logs may be rearranged in the order of similarity and displayed.

As explained above, with the log comparison debug support system according to the first embodiment, the feature values A to D representing the degree of feature of the occurrence and nonoccurrence of each of the component events ("b c f d e g" in the first embodiment) in the master log are calculated, instead of simply comparing the normalized logs. Use of these calculations and the inner product of the feature values enables similarity determination that attaches greater importance to the common inclusion of a seldom occurring (or seldom missing) event.

Comparison between partial log A and partial log D and between partial log B and partial log D each shows that there is a difference of one event. When the first event b, the difference between partial log A and partial log B, is compared with the third event f, the difference between partial log B and partial log D, the fact that the first event b is common to B and D is rarer (more characteristic) than the fact that the third event f is common to A and D. That is, it is possible to make a similarity determination that attaches greater importance to the common inclusion of an event featuring its occurrence or nonoccurrence.

Therefore, even when the amount of data in the operation log L becomes larger and the scope of debugging expands, simply specifying a reference partial log related to the target part enables a partial log similar to the reference partial log and useful for log comparison to be obtained easily. This contributes to an improvement in the efficiency of log-based debugging work including an understanding of the operation of the program.

SECOND EMBODIMENT

Hereinafter, a second embodiment of the present invention will be explained.

Figure 4:
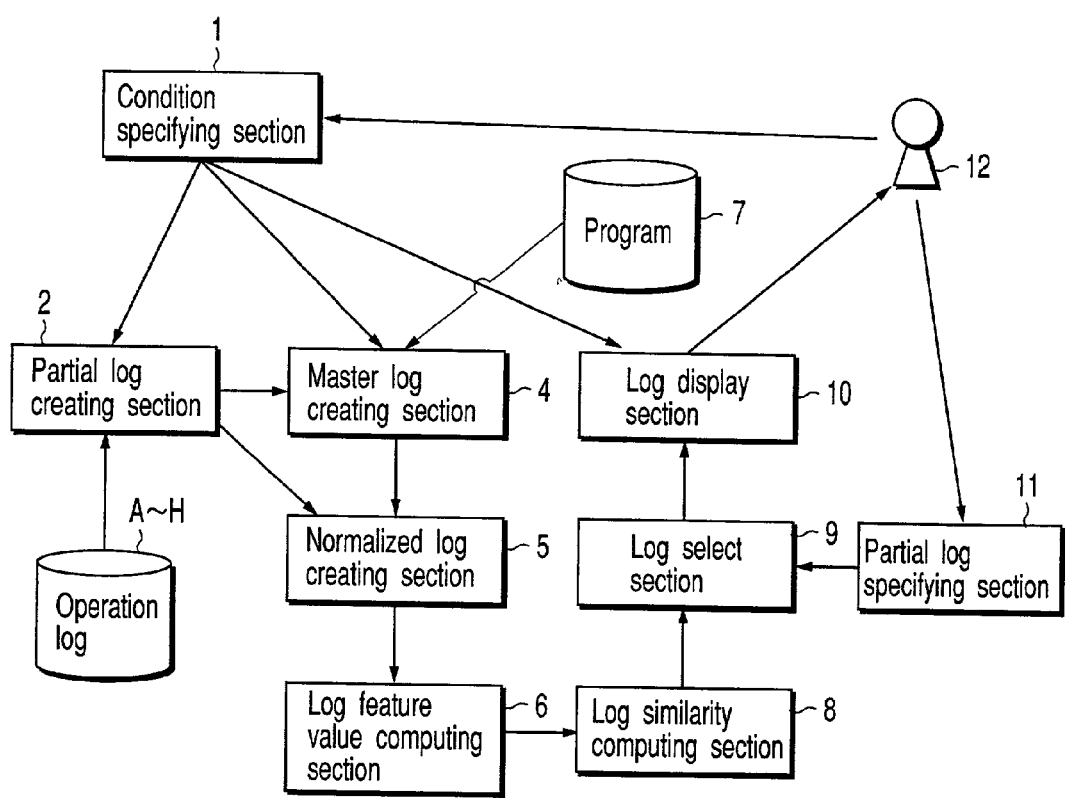
FIG. 4 is a block diagram schematically showing the configuration of a log comparison debug support system according to a second embodiment of the present invention.

FIG. 4 is a block diagram schematically showing the configuration of a log comparison debug support system according to a second embodiment of the present invention. The second embodiment relates to a debug support system, which performs log comparison using the source code of the target program as a reference. The structure of the operation log L is more practical than that in the first embodiment.

The system of the second embodiment is different from that of the first embodiment in regard to the master log creating section 7, which takes in the source code 7 of the program to be debugged and expands the source code to create the master log. The remaining component elements are the same as those of the first embodiment.

A general flow of processing in the second embodiment is the same as in the first embodiment. Hereinafter, explanation will be given, provided that a log composed of operation logs A to H is obtained as the log created as a result of the execution of program 7 shown in FIGS. 5A and 5B. FIG. 6 shows operation log D and FIG. 7 shows operation log E. The remaining logs are not shown.

First, the debugging person (user) 12 specifies a main function written in the source program of FIG. 5A as the target function in the log comparison condition. In addition, as an expansion parameter for the source program, the debugging person 12 specifies a parameter for expanding the description of a recursive call to a function in the main function up to four steps and further expanding a loop structure up to three times. Moreover, the debugging person 12 specifies that the descriptions of assignment statements, comments, and blank lines should be ignored (removed in the master log).

The master log creating section 4 then takes in the source code 7 of the target program, cuts off the descriptive part of the main function in the source code, expands the descriptive part according to the expansion parameter specified by the condition specifying section 1, and creates the result of the expansion as the master log. The master log created in this way is shown in FIGS. 8A and 8B. As seen from FIG. 8A, the function "makeValueString( . . . )" related to a recursive call is expanded and described in four steps.

Figure 10:
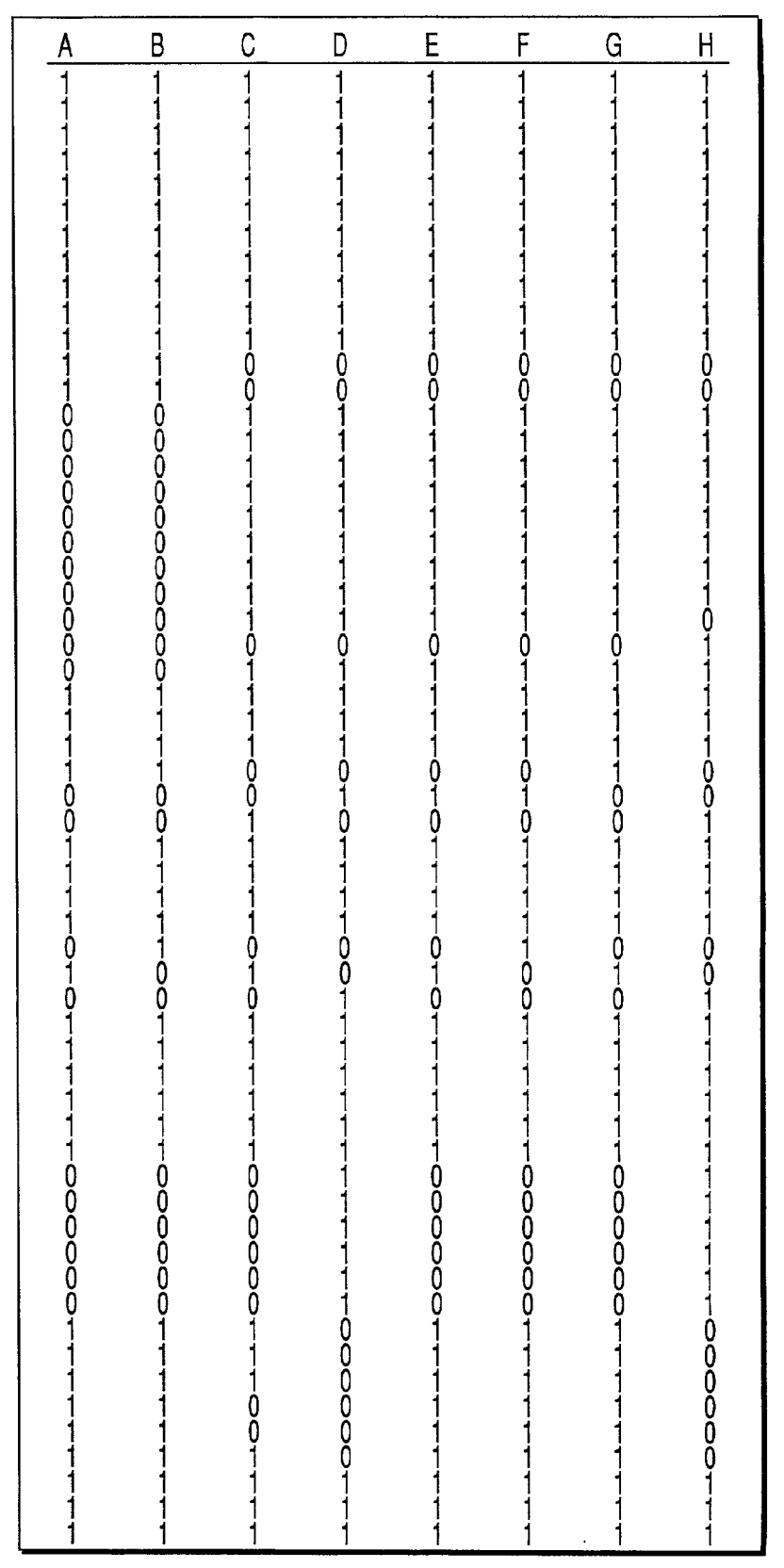

The partial log creating section 2 cuts off the part ranging from the start to end of the execution of each of the operation logs A to H as a partial log from the main function, the specified function, according to the expansion parameter given to the condition specifying section 1. Since operation log D of FIG. 6 and operation log E of FIG. 7 both correspond to the executable parts of the main function, they make partial logs as they are. Explanation will be given on the assumption that each of the operation logs (A, B, C, F, G, H) other than the operation logs D and E includes one executable log in the main function (these normalized logs are shown in FIG. 10).

The normalized log creating section 5 causes the partial logs obtained at the partial log creating section 2 to correspond to the master log obtained from the master log creating section 4. When a component event in the master log exists in the corresponding partial log, the normalized log creating section 5 creates a bit string in which 1 set. When a component event in the master log does not exist in the corresponding partial log, the normalized log creating section 5 creates a bit string in which 0 is set. Let the resulting string be a normalized log. The contents of the normalization corresponding to the program description of the partial log of operation log D are shown in FIGS. 9A and 9B. FIG. 10 is a list of the normalized logs for the partial logs A to H in the second embodiment.

The log feature value computing section 5 performs the same operation as in the first embodiment, on the basis of the normalized logs created at the normalized log creating section 5, and calculates the feature values (arrays) A to H. A list of the feature values A to H is shown in FIG. 11.

The log similarity computing section 8 carries out the same inner product process as in the first embodiment on the basis of the feature values A to H calculated at the log feature value computing section 5, thereby calculating the similarity. A list of the similarities calculated for all the combinations of the partial logs A to H is shown in FIG. 12.

It is assumed that the debugging person 12 has selected partial log D as a reference log for comparison with the partial log specifying section 11. On the basis of the similarity calculated at the log similarity computing section 8, the log select section 9 selects partial log H with a maximum similarity of 470 as the partial log most similar to the partial log D specified by the partial log specifying section 11.

Like the first embodiment, the second embodiment calculates the feature values A to H representing the degree of feature of the occurrence and nonoccurrence of each of the component events (such syntax descriptions as function calls, loops, and switches) and uses the inner product of the feature values, which enables a similarity determination that attaches greater importance to the common inclusion of a seldom occurring (or seldom missing) event.

THIRD EMBODIMENT

Next, a third embodiment of the present invention will be explained.

The third embodiment relates to a modification of the first embodiment.

The feature values and similarity explained in the first embodiment may be calculated as explained below.

At step S4, the feature value for each of the normalized logs created in the first embodiment is calculated.

The third embodiment differs from the first embodiment in that, at step S4, the probability of occurrence of events is given when an event has occurred and the probability of nonoccurrence of events is given when an event has not occurred.

| Master log: | b c f d e g |
|---|---|
| Normalized log A: | (1 1 0 0 0 1) |
| Normalized log B: | (0 1 1 0 0 1) |
| Normalized log C: | (1 1 0 1 1 1) |
| Normalized log D: | (0 1 0 0 0 1) |

For instance, event $b$ occurred in the normalized logs A and C and not in the normalized logs B and D. Therefore, the probability of occurrence of event $b$ is 0.5 and the probability of nonoccurrence of event $b$ is also 0.5. Consequently, when event $b$ has or has not occurred, the feature value is 0.5.

Similarly, event $f$ occurred only in the normalized log B, with the result that the probability of occurrence of event $f$ is 0.25 and the probability of nonoccurrence of even $f$ is 0.75. Therefore, the feature value of the occurrence of event $f$ is 0.25 and the feature value of the nonoccurrence of event $f$ is 0.75.

To summarize these, the feature values of the logs are as follows:

| Feature value A: | (0.5, 1, 0.75, 0.75, 0.75, 1) |
|---|---|
| Feature value B: | (0.5, 1, 0.25, 0.75, 0.75, 1) |
| Feature value C: | (0.5, 1, 0.75, 0.25, 0.25, 1) |
| Feature value D: | (0.5, 1, 0.75, 0.75, 0.75, 1) |

Next, at step S5, the similarity computing section 8 calculates the similarity between partial logs on the basis of the feature values A to D for all the combination of a certain partial log and the remaining partial logs.

In this step, the absolute value of the logarithm of the feature value of each event is found. When events have occurred in both of the partial logs combined, or when an event has occurred in neither of them, the absolute values are added. When an event has occurred in only one of them, one absolute value is subtracted from the other.

For example, in the combination of partial logs A and B, since an event occurred in partial log A and no event occurred in partial log B, the similarity obtained from the comparison of event $f$ is:

$-|\log(0.75)|-|\log(0.25)|$.

Comparison of event $d$ gives:

$+|\log(0.75)|+|\log(0.75)|$, since an event not occurred in neither of partial logs A and B.

Similar calculations are done, giving the similarity AB between partial logs A and B:

$$AB = -|\log(0.5)| - |\log(0.5)| + |\log(1)| + |\log(1)| - |\log(0.75)| -$$
$$|\log(0.25)| + |\log(0.75)| + |\log(0.75)| + |\log(1)| + |\log(1)|$$
$$= -1.18$$

The result of doing calculations for all the combinations is as follows:

AB=−1.18
AC=−0.6
AD=0.15
BC=−2.775
BD=0.375
CD=−1.8

According to the third embodiment, the advantage equal to that of the first embodiment is obtainable, since the similarity value as for the combination of partial logs B and D has the preferable, largest value of 0.375 as in the first embodiment. It should be noted that persons skilled in the art will recognize that the third embodiment is easily applied to the second embodiment.

With the present invention, even when the amount of data becomes larger because of a relatively large number of operation logs A to H and the scope of debugging expands, simply specifying a reference partial log related to the target part enables a partial log similar to the reference partial log and useful for log comparison to be obtained easily. This contributes to an improvement in the efficiency of log-based debugging work including an understanding of the operation of the program.

This invention is not limited to the above-described embodiments and may be practiced or embodied in still other ways without departing from the spirit or essential character thereof. For instance, while the operation on the feature values of the partial logs has been performed by internal product or probability, the operation may be performed using another algorithm. The partial logs may be inputted directly, instead of being created automatically. Alternatively, a prepared master log is inputted directly, instead of the concatenation of partial logs or the automatic creation of a master log referring to the source program. In this case, although it is troublesome to prepare a suitable log and master log, the advantage is that useful information for log comparison is obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer implemented log comparison debug support system which inputs a plurality of logs in which a series of events that have occurred as a result of the execution of a target program are recorded, and supports debugging by performing log comparison, the system comprising:
    a condition specifying device configured to specify a condition for log comparison, which includes begin and end events in a partial log, and to specify an extraction rule for extracting at least part of the event sequence sandwiched between the begin and end events;
    a partial log creating device configured to create a plurality of partial logs from the input logs according to the condition for log comparison and the extraction rule;
    a master log creating device configured to create a master log by concatenating the partial logs;
    a normalized log creating device configured to create normalized logs by normalizing said partial logs by use of the master log serving as a normalization reference;
    a feature value computing device configured to compute feature values representing the degree of feature of the occurrence and nonoccurrence of said events for each of the normalized logs created by said normalized log creating device; and
    a similarity computing device configured to compute, in a combination of a specific partial log and another partial log, the similarity between these partial logs by performing a specific operation based on said feature values.

2. The system of claim 1, wherein said feature value computing device computes one feature value in one normalized log by referring to the other normalized logs.

3. The system of claim 1, wherein said similarity computing device computes the similarity between said combination of partial logs by inner product operation of respective feature values of the normalized logs.

4. The system of claim 1, wherein said feature value computing device computes probability of occurrence or nonoccurrence of events as said feature value.

5. The system of claim 4, wherein said similarity computing device computes the similarity between said combination of partial logs by adding or subtracting of the absolute value of a logarithm of respective feature values of the normalized logs.

6. The system of claim 1, further comprising:
    a specifying device configured to specify one of said partial logs;
    a selecting device, coupled between said similarity computing device and the specifying device, configured to select another partial log which is similar to said specified log according to the similarity computed by said similarity computing device.

7. A computer implemented log comparison debug support system which inputs a plurality of operation logs in which a series of events that have occurred as a result of the execution of a target program are recorded, and supports debugging by performing log comparison, the system comprising:
    a condition specifying device configured to specify a condition for log comparison, which includes begin and end events in a partial log, and to specify an extraction rule for extracting at least part of the event sequence sandwiched between the begin and end events;
    a partial log creating device configured to create a plurality of partial logs from the input operation logs according to the condition for log comparison and the extraction rule;
    a master log creating device configured to input a source program of said target program to create a master log by expanding the source program;
    a normalized log creating device configured to create normalized logs by normalizing said partial logs by use of the master log serving as a normalization reference;
    a feature value computing device configured to compute feature values representing the degree of feature of the occurrence and nonoccurrence of said events for each of the normalized logs created by said normalized log creating device; and
    a similarity computing device configured to compute, in a combination of a specific partial log and another partial log, the similarity between these partial logs by performing a specific operation based on said feature values.

8. The system of claim 7, wherein said master log creating device comprises an expander configured to expand a description corresponding to a specific function in the source program, and create the result of the expansion as said master log.

9. The system of claim 8, wherein said expander expands a description of specific syntax including function calls and loops in said specific function.

10. The system of claim 7, wherein said feature value computing device computes one feature value in one normalized log by referring to the other normalized logs.

11. The system of claim 7, wherein said similarity computing device computes the similarity between said combination of partial logs by inner product operation of respective feature values of the normalized logs.

12. The system of claim 7, wherein said feature value computing device computes probability of occurrence or nonoccurrence of events as said feature value.

13. The system of claim 12, wherein said similarity computing device computes the similarity between said combination of partial logs by adding or subtracting of the absolute value of a logarithm of respective feature values of the normalized logs.

14. The system of claim 7, further comprising:
a specifying device configured to specify one of said partial logs;
a selecting device, coupled between said similarity computing device and the specifying device, configured to select another partial log which is similar to said specified log according to the similarity computed by said similarity computing device.

15. A computer implemented method for supporting log comparison debugging, the method comprising:
inputting a plurality of logs in which a series of events that have occurred as a result of the execution of a target program are recorded;
specifying a condition for log comparison, which includes begin and end events in a partial log;
specifying an extraction rule for extracting at least part of the event sequence sandwiched between the begin and end events;
creating a plurality of partial logs from the input logs according to the condition for log comparison and the extraction rule;
creating a master log by concatenating the partial logs;
creating normalized logs by normalizing said partial logs by use of the master log serving as a normalization reference;
computing feature values representing the degree of feature of the occurrence and nonoccurrence of said events for each of the normalized logs; and
computing, in a combination of a specific partial log and another partial log, the similarity between these partial logs by performing a specific operation based on said feature values.

16. A computer implemented method for supporting log comparison debugging, the method comprising:
inputting a plurality of operation logs in which a series of events that have occurred as a result of the execution of a target program are recorded;
specifying a condition for log comparison, which includes begin and end events in a partial log;
specifying an extraction rule for extracting at least part of the event sequence sandwiched between the begin and end events;
creating a plurality of partial logs from the input operation logs according to the condition for log comparison and the extraction rule;
inputting a source program of said target program and creating a master log based on the source program by expanding the source program;
creating normalized logs by normalizing said partial logs by use of the master log serving as a normalization reference;
computing feature values representing the degree of feature of the occurrence and nonoccurrence of said events for each of the normalized logs; and
computing, in a combination of a specific partial log and another partial log, the similarity between these partial logs by performing a specific operation based on said feature values.

17. A computer program product configured to store program instructions for execution on a computer system enabling the system to perform:
inputting a plurality of logs in which a series of events that have occurred as a result of the execution of a target program are recorded;
specifying a condition for log comparison, which includes begin and end events in a partial log;
specifying an extraction rule for extracting at least part of the event sequence sandwiched between the begin and end events;
creating a plurality of partial logs from the input logs according to the condition for log comparison and the extraction rule;
creating a master log by concatenating the partial logs;
creating normalized logs by normalizing said partial logs by use of the master log serving as a normalization reference;
computing feature values representing the degree of feature of the occurrence and nonoccurrence of said events for each of the normalized logs; and
computing, in a combination of a specific partial log and another partial log, the similarity between these partial logs by performing a specific operation based on said feature values.

18. A computer program product configured to store program instructions for execution on a computer system enabling the system to perform:
inputting a plurality of operation logs in which a series of events that have occurred as a result of the execution of a target program are recorded;
specifying a condition for log comparison, which includes begin and end events in a partial log;
specifying an extraction rule for extracting at least part of the event sequence sandwiched between the begin and end events;
creating a plurality of partial logs from the input operation logs according to the condition for log comparison and the extraction rule;
inputting a source program of said target program and creating a master log based on the source program by expanding the source program;
creating normalized logs by normalizing said partial logs by use of the master log serving as a normalization reference;
computing feature values representing the degree of feature of the occurrence and nonoccurrence of said events for each of the normalized logs; and
computing, in a combination of a specific partial log and another partial log, the similarity between these partial logs by performing a specific operation based on said feature values.

* * * * *